(12) United States Patent
Funamizu et al.

(10) Patent No.: US 12,520,059 B2
(45) Date of Patent: Jan. 6, 2026

(54) IMAGE SENSOR, IMAGE CAPTURING DEVICE AND CAPACITANCE DEVICE

(71) Applicant: NIKON CORPORATION, Tokyo (JP)

(72) Inventors: Wataru Funamizu, Yokohama (JP); Yojiro Tezuka, Yokohama (JP); Masahiro Juen, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 18/130,046

(22) Filed: Apr. 3, 2023

(65) Prior Publication Data

US 2023/0239591 A1 Jul. 27, 2023

Related U.S. Application Data

(63) Continuation of application No. 17/188,045, filed on Mar. 1, 2021, now abandoned, which is a (Continued)

(30) Foreign Application Priority Data

Feb. 29, 2016 (JP) ................................ 2016-038156

(51) Int. Cl.
*H04N 25/65* (2023.01)
*H04N 25/78* (2023.01)
(Continued)

(52) U.S. Cl.
CPC ............. *H04N 25/65* (2023.01); *H04N 25/78* (2023.01); *H04N 25/79* (2023.01); *H10F 39/809* (2025.01)

(58) Field of Classification Search
CPC ........ H04N 25/65; H04N 25/75; H04N 25/79; H01L 27/14634
See application file for complete search history.

(56) References Cited

U.S. PATENT DOCUMENTS 7,265,708 B2 * 9/2007 Mitra .................... H03M 1/004
 341/172
9,456,160 B2 * 9/2016 Shim ..................... H04N 25/533
(Continued)

FOREIGN PATENT DOCUMENTS

CN 103066964 A 4/2013
JP 2009-290439 A 12/2009
(Continued)

OTHER PUBLICATIONS

May 16, 2017 International Search Report issued in International Patent Application No. PCT/JP2017/007547.
(Continued)

*Primary Examiner* — Quan Pham
(74) *Attorney, Agent, or Firm* — Oliff PLC

(57) ABSTRACT

An image sensor includes: a pixel that generates a pixel signal based upon incident light having entered therein; and a generation unit that includes a first input unit to which the pixel signal is input, a second input unit to which a first reference signal with a shifting voltage is input, and an output unit that outputs an output signal generated based upon the pixel signal and the first reference signal, wherein: the generation unit further includes a first capacitance disposed between the first input unit and the output unit, a second capacitance disposed between the second input unit and the output unit, and a third capacitance connected to either one of the first capacitance and the second capacitance.

17 Claims, 13 Drawing Sheets

Related U.S. Application Data continuation of application No. 16/078,079, filed as application No. PCT/JP2017/007547 on Feb. 27, 2017, now abandoned.

(51) Int. Cl.
*H04N 25/79* (2023.01)
*H10F 39/00* (2025.01)

(56) References Cited

U.S. PATENT DOCUMENTS

| | | | |
|---|---|---|---|
| 2006/0023109 A1* | 2/2006 | Mabuchi | H04N 25/69 348/340 |
| 2008/0192126 A1 | 8/2008 | Purcell et al. | |
| 2009/0212985 A1 | 8/2009 | Kasuga et al. | |
| 2009/0237536 A1 | 9/2009 | Purcell et al. | |
| 2011/0141332 A1 | 6/2011 | Noda et al. | |
| 2012/0049042 A1 | 3/2012 | Lim et al. | |
| 2012/0133808 A1 | 5/2012 | Park et al. | |
| 2013/0026343 A1 | 1/2013 | Saito et al. | |
| 2013/0100326 A1 | 4/2013 | Ueno | |
| 2014/0175592 A1* | 6/2014 | Iwabuchi | H01L 27/14625 257/443 |
| 2015/0055001 A1* | 2/2015 | Bock | H04N 25/778 348/308 |
| 2015/0172580 A1* | 6/2015 | Zhang | H04N 25/77 250/208.1 |
| 2015/0229832 A1 | 8/2015 | Itano et al. | |
| 2015/0244388 A1 | 8/2015 | Hashimoto et al. | |
| 2016/0079995 A1* | 3/2016 | Zare-Hoseini | H03M 1/403 341/120 |
| 2016/0309106 A1* | 10/2016 | Zuo | H04N 25/77 |
| 2016/0336949 A1* | 11/2016 | Milkov | H03K 4/08 |
| 2016/0373675 A1 | 12/2016 | Endo | |

FOREIGN PATENT DOCUMENTS

| | | |
|---|---|---|
| JP | 2013-030997 A | 2/2013 |
| JP | 2015-023391 A | 2/2015 |
| WO | 2014/167882 A1 | 10/2014 |

OTHER PUBLICATIONS

Oct. 1, 2019 Office Action issued in Japanese Patent Application No. 2018-503303.
Apr. 9, 2020 Office Action issued in U.S. Appl. No. 16/078,079.
Apr. 29, 2020 Office Action issued in Chinese Patent Application No. 201780023144.0.
Jun. 2, 2020 Office Action issued in Japanese Patent Application No. 2018-503303.
Sep. 29, 2020 Office Action issued in U.S. Appl. No. 16/078,079.
Feb. 2, 2021 Office Action issued in Chinese Patent Application No. 201780023144.0.
Sep. 10, 2021 Office Action issued in Chinese Patent Application No. 201780023144.0.
Feb. 23, 2022 Office Action issued in U.S. Appl. No. 17/188,045.
Mar. 2, 2022 Office Action issued in Chinese Patent Application No. 201780023144.0.
Aug. 1, 2022 Office Action issued in Chinese Patent Application No. 201780023144.0.
Nov. 2, 2022 Office Action issued in U.S. Appl. No. 17/188,045.
Apr. 26, 2023 Notification of Reexamination issued in Chinese Patent Application No. 201780023144.0.
Aug. 30, 2023 Decision of Reexamination issued in Chinese Patent Application No. 201780023144.0.

\* cited by examiner

FIG.9

| SW21 | SW22 | SW11 | SW12 | ADC CONVERSION GAIN [LSB/V] |
|---|---|---|---|---|
| off | on | off | on | $Gc = \dfrac{C0}{\Delta Vr \cdot (Cr+C1+C2)} \cdot 4096$ |
| off | on | on | off | $Gc = \dfrac{C0+C1}{\Delta Vr \cdot (Cr+C2)} \cdot 4096$ |
| on | off | off | on | $Gc = \dfrac{C0+C2}{\Delta Vr \cdot (Cr+C1)} \cdot 4096$ |
| on | off | on | off | $Gc = \dfrac{C0+C1+C2}{\Delta Vr \cdot Cr} \cdot 4096$ |

FIG.11

| SW21 | SW22 | SW11 | SW12 | ADC CONVERSION GAIN [LSB/V] |
|---|---|---|---|---|
| off | on | on | off | $Gc = \dfrac{C1}{\Delta Vr \cdot (Cr+C2)} \cdot 4096$ |
| on | off | off | on | $Gc = \dfrac{C2}{\Delta Vr \cdot (Cr+C1)} \cdot 4096$ |
| on | off | on | off | $Gc = \dfrac{C1+C2}{\Delta Vr \cdot Cr} \cdot 4096$ |

(a)

(b)

IMAGE SENSOR, IMAGE CAPTURING DEVICE AND CAPACITANCE DEVICE

This is a Continuation of application Ser. No. 17/188,045 filed Mar. 1, 2021, which is a Continuation of application Ser. No. 16/078,079 filed Jan. 22, 2019, which is a National Stage Application of PCT/JP2017/007547 filed Feb. 27, 2017, which in turn claims priority to Japanese Application No. 2016-038156 filed Feb. 29, 2016. The entire disclosures of the prior applications are hereby incorporated by reference herein in their entireties.

TECHNICAL FIELD

The present invention relates to an image sensor, an image capturing device and a capacitance device.

BACKGROUND ART

There is an image sensor known in the related art that includes an adjustment unit engaged in adjustment of ADC conversion gain. Noise occurs in this image sensor as the capacitance of the adjustment unit enters a floating state.

CITATION LIST

Patent Literature

PTL: Japanese Laid Open Patent Publication No. 2013-30997

SUMMARY OF INVENTION

According to the 1st aspect of the present invention, an image sensor comprises: a pixel that generates a pixel signal based upon incident light having entered therein; and a generation unit that includes a first input unit to which the pixel signal is input, a second input unit to which a first reference signal with a shifting voltage is input, and an output unit that outputs an output signal generated based upon the pixel signal and the first reference signal, wherein: the generation unit further includes a first capacitance disposed between the first input unit and the output unit, a second capacitance disposed between the second input unit and the output unit, and a third capacitance connected to either one of the first capacitance and the second capacitance.

According to the 2nd aspect of the present invention, an image sensor comprises: a pixel that generates a pixel signal based upon incident light having entered therein; a first input unit to which the pixel signal is input, a second input unit to which a first reference signal with a voltage that changes at a constant rate is input, an output unit that outputs an output signal generated based upon the pixel signal and the first reference signal, a first capacitance disposed between the first input unit and the output unit, a second capacitance disposed between the second input unit and the output unit; and a third capacitance connected in parallel to either one of the first capacitance and the second capacitance.

According to the 3rd aspect of the present invention, an image sensor comprises: a photoelectric conversion unit that converts incident light having entered therein to an electric charge, a capacitance unit that includes a first capacitance, a second capacitance, and a third capacitance connected in parallel to either one of the first capacitance and the second capacitance, and outputs an output signal generated based upon a signal provided from the photoelectric conversion unit and a first reference signal; and a comparator unit that compares the output signal output from the capacitance unit with a second reference signal, wherein: a signal level of the output signal output from the capacitance unit when the third capacitance is connected in parallel to the first capacitance is different from the signal level of the output signal output from the capacitance unit when the third capacitance is connected in parallel to the second capacitance.

According to the 4th aspect of the present invention, an image capturing device comprises: an image sensor according to any one of the 1st through the 3rd aspects; and an image generation unit that generates image data based upon pixel signals generated based upon the incident light.

According to the fifth aspect of the present invention, a capacitance device comprises: a first input unit to which a first signal is input, a second input unit to which a second signal is input, an output unit that outputs an output signal generated based upon the first signal and the second signal, a first capacitance connected between the first input unit and the output unit, a second capacitance connected between the second input unit and the output unit; and a third capacitance connected in parallel to either one of the first capacitance and the second capacitance.

DESCRIPTION OF EMBODIMENTS

First Embodiment

Figure 1:
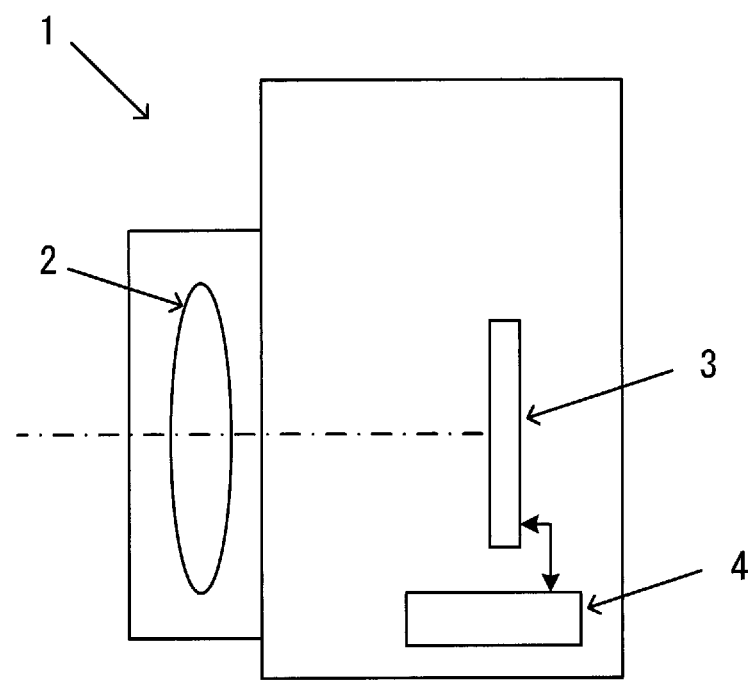
FIG. 1 A block diagram illustrating the structure of the image capturing device achieved in a first embodiment FIG. 2 A circuit diagram illustrating the structure adopted in a pixel in the first embodiment FIG. 3 A circuit diagram illustrating the structures adopted in the A/D conversion unit and the first reference signal generation unit in the first embodiment FIG. 4 A timing chart pertaining to an operation executed by the A/D conversion unit in the first embodiment FIG. 5 A circuit diagram illustrating how the A/D conversion gain may be adjusted in the image sensor in the first embodiment FIG. 6 A timing chart indicating how the A/D conversion unit is engaged in correlated double sampling in the first embodiment FIG. 7 A sectional view of the structure adopted in the image sensor in the first embodiment FIG. 8 A circuit diagram illustrating the structures adopted in the A/D conversion unit and the first reference signal generation unit in a second embodiment FIG. 9 A chart indicating various switching states assumed in the A/D conversion unit in the second embodiment and the corresponding gains FIG. 10 A circuit diagram illustrating the structures adopted in the A/D conversion unit and the first reference signal generation unit in a third embodiment FIG. 11 A chart indicating various switching states assumed in the A/D conversion unit in the third embodiment and the corresponding gains FIG. 12 A circuit diagram illustrating the structure adopted in the A/D conversion unit in variation 1

FIG. 1 is a block diagram illustrating the structure adopted in the image capturing device achieved in the first embodiment. An image capturing device 1 includes a photographic optical system 2, an image sensor 3 and a control unit 4. The image capturing device 1 may be, for instance, a camera. The photographic optical system 2 forms a subject image on the image sensor 3. The image sensor 3 generates image signals by capturing the subject image formed via the photographic optical system 2. The image sensor 3 may be, for instance, a CMOS image sensor. The control unit 4 outputs to the image sensor 3 a control signal used to control an operation of the image sensor 3. In addition, the control unit 4 functions as an image generation unit that generates image data by executing various types of image processing on image signals output from the image sensor 3. It is to be noted that the photographic optical system 2 may be a detachable system that can be mounted at or dismounted from the image capturing device 1.

Figure 2:
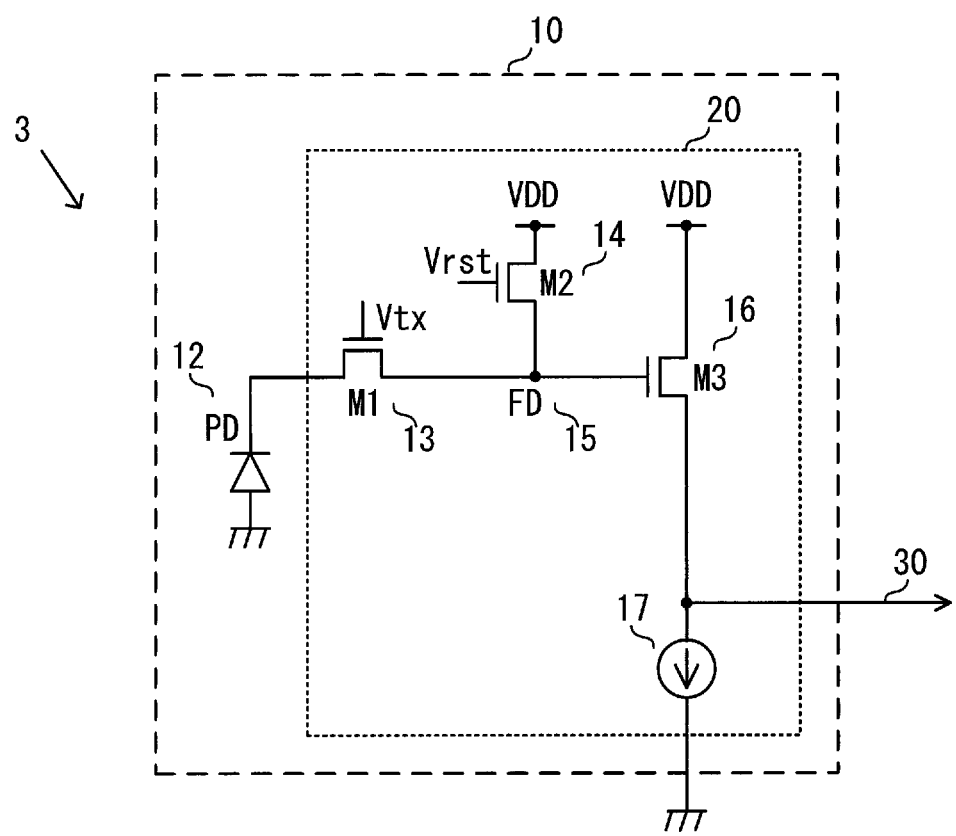

FIG. 2 is a circuit diagram illustrating the structure adopted in a pixel in the first embodiment. The image sensor 3 includes a plurality of pixels 10 disposed in a two-dimensional pattern. The pixels 10 each include a photoelectric conversion unit 12 constituted with, for instance, a photodiode (PD) and a readout unit 20. The photoelectric conversion unit 12 has a function of converting light having entered therein to an electric charge and accumulating the electric charge resulting from the photoelectric conversion. The readout unit 20 includes, for instance, a transfer unit 13, a reset unit (discharge unit) 14, a floating diffusion (FD) 15, an amplifier unit 16 and a current source 17.

The transfer unit 13, which is controlled with a signal Vtx, transfers the electric charge resulting from the photoelectric conversion executed at the photoelectric conversion unit 12 to the floating diffusion 15. In other words, the transfer unit 13 forms an electric charge transfer path between the photoelectric conversion unit 12 and the floating diffusion 15. The electric charge is accumulated (held) at the floating diffusion 15.

The reset unit 14, which is controlled with a signal Vrst, discharges the electric charge at the floating diffusion 15, thereby resetting the potential at the floating diffusion 15 to a reset potential (reference potential). The transfer unit 13 and the reset unit 14 may be constituted with, for instance, a transistor M1 and a transistor M2 respectively.

The amplifier unit 16 outputs a signal generated by amplifying the electric charge accumulated in the floating diffusion 15. In the example presented in FIG. 2, the amplifier unit 16 is constituted with a transistor M3 with the drain terminal, the gain terminal and the source terminal thereof respectively connected to a source VDD, the floating diffusion 15 and the current source 17. The current source 17 supplies an electric current, used to output a signal corresponding to the electric charge accumulated in the floating diffusion 15, to the amplifier unit 16. The amplifier unit 16 functions as part of a source follower circuit by using the current source 17 as a load current source. Namely, the amplifier unit 16 generates a signal by amplifying the electric charge held in the floating diffusion 15 and outputs the signal thus generated to a signal line 30.

The readout unit 20 reads out, in sequence, a signal (photoelectric conversion signal) corresponding to the electric charge transferred from the photoelectric conversion unit 12 to the floating diffusion 15 via the transfer unit 13 and a signal (dark signal), generated as the potential at the floating diffusion 15 is reset to the reset potential, to the signal line 30. The dark signal indicates a reference level for the photoelectric conversion signal. The photoelectric conversion signal and the dark signal output in sequence to the signal line 30 are input to an analog/digital conversion unit (A/D conversion unit) 40 which will be described later.

Figure 3:
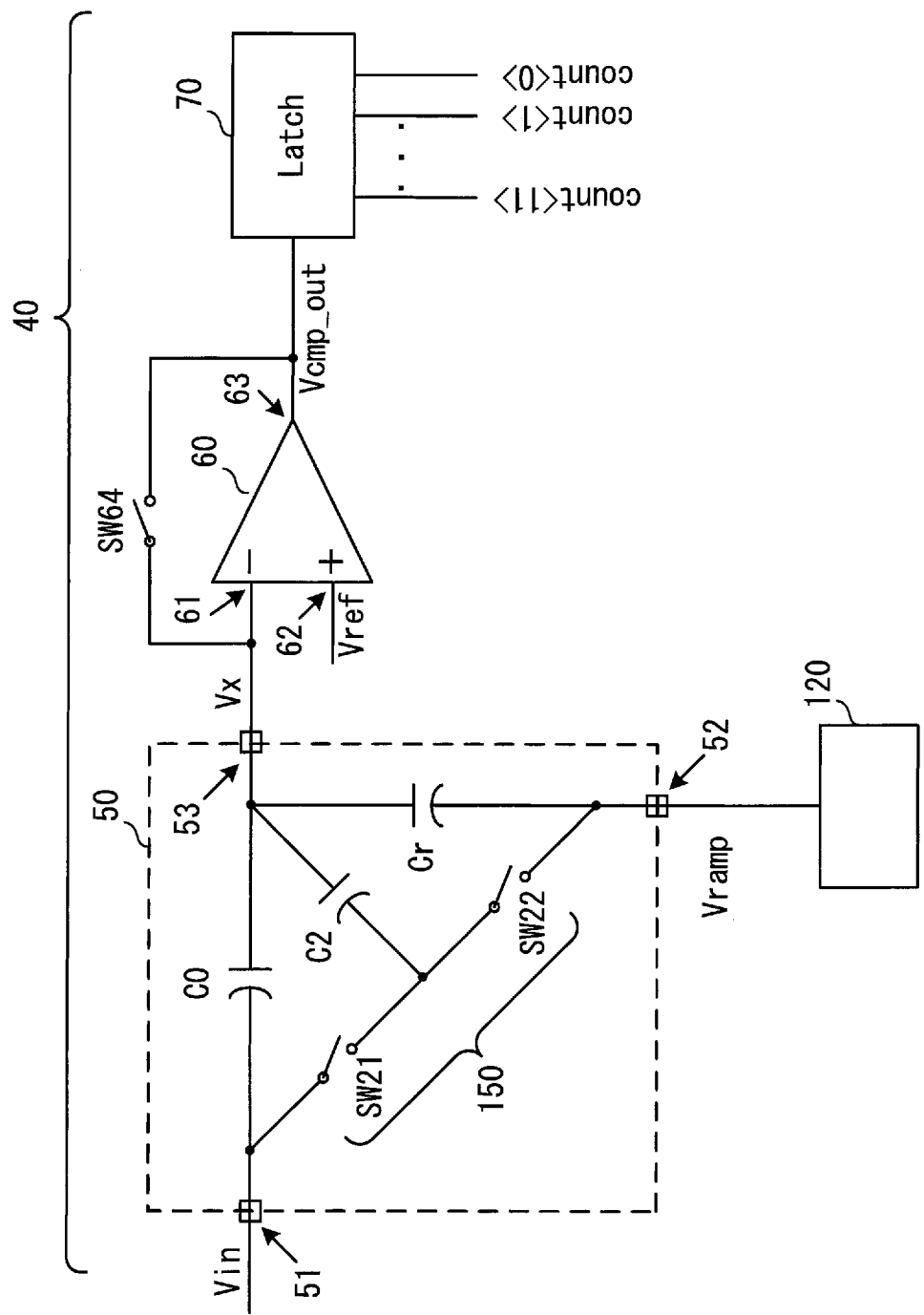

FIG. 3 is a circuit diagram illustrating the structures adopted in the A/D conversion unit and a first reference signal generation unit in the first embodiment. An A/D conversion unit 40 converts the photoelectric conversion signal and the dark signal, which are analog signals, to digital signals. The A/D conversion unit 40 is configured with a capacitance unit 50, a comparator unit 60 and a storage unit 70. The capacitance unit 50, the comparator unit 60 and the storage unit 70 are disposed in correspondence to each pixel 10. A first reference signal generation unit 120 generates a ramp signal with a shifting signal level as a first reference signal Vramp. In addition, the first reference signal generation unit 120 is commonly connected to the capacitance units 150, each disposed in correspondence to one of the pixels 10, and provides the first reference signal Vramp to the individual capacitance units 50.

The capacitance unit 50 disposed in correspondence to a given pixel 10 generates an output signal Vx based upon the photoelectric conversion signal or the dark signal input thereto from the pixel 10 as a signal Vin and the first reference signal Vramp input thereto from the first signal generation unit 120, and outputs the output signal Vx to the comparator unit 60. This means that the capacitance unit 50 is also a generation unit 50 that generates the output signal Vx based upon the signal Vin and the first reference signal Vramp, and the capacitance unit 50 (generation unit 50) outputs the signal Vx having been generated to the comparator unit 60. The capacitance unit 50 includes a first input unit 51 to which the photoelectric conversion signal and the dark signal are input, a second input unit 52 to which the first reference signal Vramp is input, an output unit 53 that outputs the output signal Vx, a capacitance (capacitor) C0 connected between the first input unit 51 and the output unit 53, a capacitance (capacitor) Cr connected between the second input unit 52 and the output unit 53, and a capacitance (capacitor) C2 connected in parallel to either the capacitance C0 or the capacitance Cr. The capacitance unit 50 further includes a first switch unit 150 that connects the capacitance C2 to either one of the capacitance C0 and the capacitance Cr. The first switch unit 150 includes a switch SW21 and a switch SW22. The state of electric connection between the capacitance C0 and the capacitance C2 is switched via the switch SW21, whereas the state of electric connection between the capacitance Cr and the capacitance C2 is switched via the switch SW22.

At the comparator unit 60, which is constituted with a comparator circuit or the like, the output signal Vx from the capacitance unit 50 is input to a first input terminal 61 and a second reference signal Vref is input to a second input terminal 62. A second reference signal generation unit 130 (not shown) generates the second reference signal Vref input to the second input terminal 62. The second reference signal generation unit 130 is commonly connected to the comparator units 60, each disposed in correspondence to one of the pixels 10, and provides the second reference signal Vref to the individual comparator units 60. The comparator unit 60 compares the output signal Vx with the second reference signal Vref. A signal Vcmp_out indicating the results of comparison provided by the comparator unit 60 is output from an output terminal 63 of the comparator unit 60 and is input to the storage unit 70. In addition, a switch SW64 is connected between the output terminal 63 and the first input terminal 61 at the comparator unit 60. The ON/OFF state of the switch SW64 is controlled with a signal Vaz. The storage unit 60 is constituted with a latch circuit or the like. In the example presented in FIG. 3, count <0>~count <11>, indicating a count value, is input to the storage unit 70, and the A/D conversion unit 40 is configured as a 12-bit A/D conversion circuit. Based upon the signal Vcmp_out, a count value corresponding to the length of time having elapsed since the comparator unit 60 started a comparison operation is stored in the storage unit 70 as a digital signal.

Figure 4:
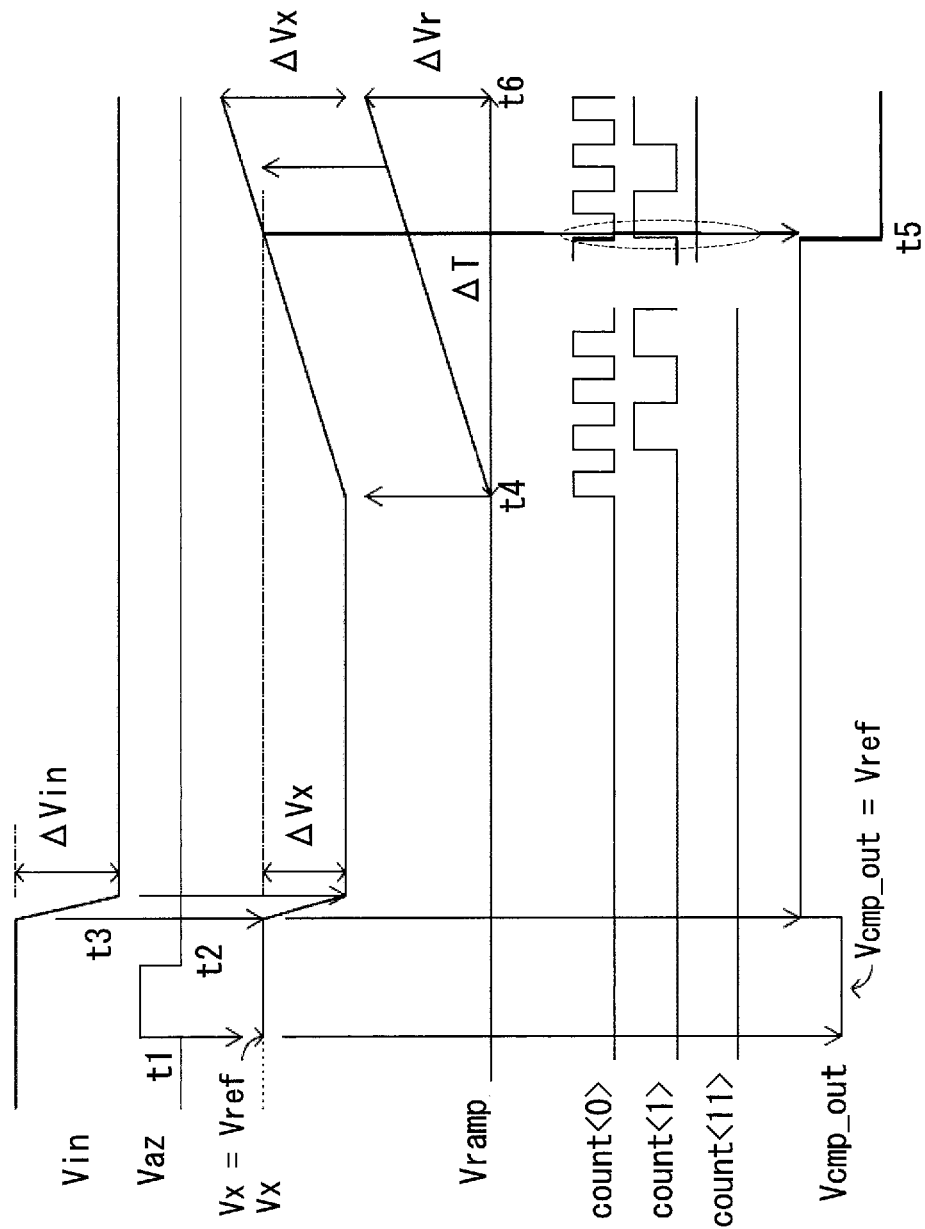

FIG. 4 presents a timing chart indicating how an operation may be executed in the A/D conversion unit 40 in the first embodiment. In FIG. 4, signal voltage levels are indicated along the vertical axis, whereas time points are indicated along the horizontal axis.

At a time point t1, the signal Vaz shifts to high level, thereby turning on the switch SW64, which is controlled with the signal Vaz. As the switch SW64 is turned on, the potentials of the output signal Vx and the signal Vcmp_out are both set to a level matching the potential of the second reference signal Vref. At a time point t2, the signal Vaz shifts to lower level, thereby turning off the switch SW64.

At a time point t3, the potential of the signal Vin provided from the pixel 10 shifts by ΔVin. For instance, when the signal output from the pixel 10 switches from the dark signal to the photoelectric conversion signal, the potential of the signal Vin becomes lower by ΔVin. As the potential of the signal Vin shifts, the potential of the output signal Vx output from the output unit 53 of the capacitance unit 50 shifts by ΔVx. When the switch SW21 is in an ON state and the switch SW22 is in an OFF state, i.e., when the capacitance C2 is connected in parallel to the capacitance C0, the shift quantity ΔVx indicating the extent to which the potential of the output signal Vx changes, can be expressed as in equation (1) below.

$$\Delta Vx = \Delta Vin \times (C0+C2)/[(C0+C2)+Cr] \tag{1}$$

Sin, representing the shift quantity (sensitivity) by which the potential of the output signal Vx shifts relative to the shift quantity of the potential of the signal Vin, can be expressed as in equation (2) below.

$$Sin = \Delta Vx/\Delta Vin = (C0+C2)/[(C0+C2)+Cr] \tag{2}$$

In addition, if the potential of the output signal Vx input to the first input terminal 61 becomes lower than the potential of the second reference signal Vref input to the second input terminal 62, the comparator 60 shifts the potential of the signal Vcmp_out to high level.

During a time period ΔT elapsing between a time point t4 and a time point t6, the potential of the first reference signal Vramp increases as the time passes. In addition, as the potential of the first reference signal Vramp increases over time, the potential of the output signal Vx, too, increases over time. Assuming that the potential of the first reference signal Vramp changes by ΔVr over the time period ΔT, the shift quantity ΔVx by which the potential of the output signal Vx changes can be expressed as in equation (3) below.

$$\Delta Vx = \Delta Vr \times Cr/[(C0+C2)+Cr] \tag{3}$$

Sr, representing the shift quantity (sensitivity) of the potential of the output signal Vx relative to the shift quantity of the potential of the first reference signal Vramp, can be expressed as in equation (4) below.

$$Sr = \Delta Vx/\Delta Vr = Cr/[(C0+C2)+Cr] \tag{4}$$

In addition, as the relationship between the level of the potential of the output signal Vx and the level of the potential of the second reference signal Vref changes at a time point t5, the comparator unit 60 shifts the potential of the signal Vcmp_out from high level to low level. The count value indicated by count <0>~count <11> as the signal Vcmp_out shifts from high level to low level is stored (held) in the storage unit 70. If the count value changes from 0 to 4095 LSB during the time period ΔT, Count_Latch, representing the count value stored in the storage unit 70, can be expressed as in equation (5) below.

$$Count\_Latch = (\Delta Vin \times Sin)/(\Delta Vr \times Sr) \times 4096 \text{ LSB} \tag{5}$$

As equation (5) above indicates, the relationship between the input signal Vin provided to the A/D conversion unit 40 and the count value Count_Latch, indicating the A/D conversion results, is determined by Sin/Sr.

In addition, when the switch SW21 is in an OFF state and the switch SW22 is in an ON state, i.e., when the capacitance C2 is connected in parallel to the capacitance Cr, Sin and Sr can be respectively expressed as in equation (6) and equation (7) below.

$$Sin = \Delta Vx/\Delta Vin = C0/[C0+(C2+Cr)] \tag{6}$$

$$Sr = \Delta Vx/\Delta Vr = (Cr+C2)/[C0+(C2+Cr)] \tag{7}$$

Gc, representing the ADC conversion gain (Gc=Count_Latch/ΔVin) set at the A/D conversion unit 40 when the switch SW21 is in an ON state and the switch SW22 is in an OFF state, i.e., when the capacitance C2 is connected in parallel to the capacitance C0, can be expressed as in equation (8) below.

$$Gc = (C0+C2)/(\Delta Vr \times Cr) \times 4096 \text{ LSB} \tag{8}$$

The ADC conversion gain Gc set when the switch SW21 is in an OFF state and the switch SW22 is in an ON state, i.e., when the capacitance C2 is connected in parallel to the capacitance Cr, can be expressed as in equation (9) below.

$$Gc = C0/[\Delta Vr \times (Cr+C2)] \times 4096 \text{ LSB} \tag{9}$$

Comparison of the equation expressing the conversion gain set when the capacitance C2 is connected in parallel to the capacitance C0 with the conversion gain set when the capacitance C2 is connected in parallel to the capacitance Cr reveals that a greater ADC conversion gain Gc is obtained by connecting the capacitance C2 in parallel to the capacitance C0 and a smaller ADC conversion gain Gc is obtained by connecting the capacitance C2 in parallel to the capacitance Cr. This means that the ADC conversion gain Gc can be changed by adjusting the connection state for the capacitance C2. In addition, by connecting the capacitance C2 in parallel to either one of the capacitance C0 and the capacitance Cr, the capacitance C2 can be prevented from entering a floating state.

Figure 5:
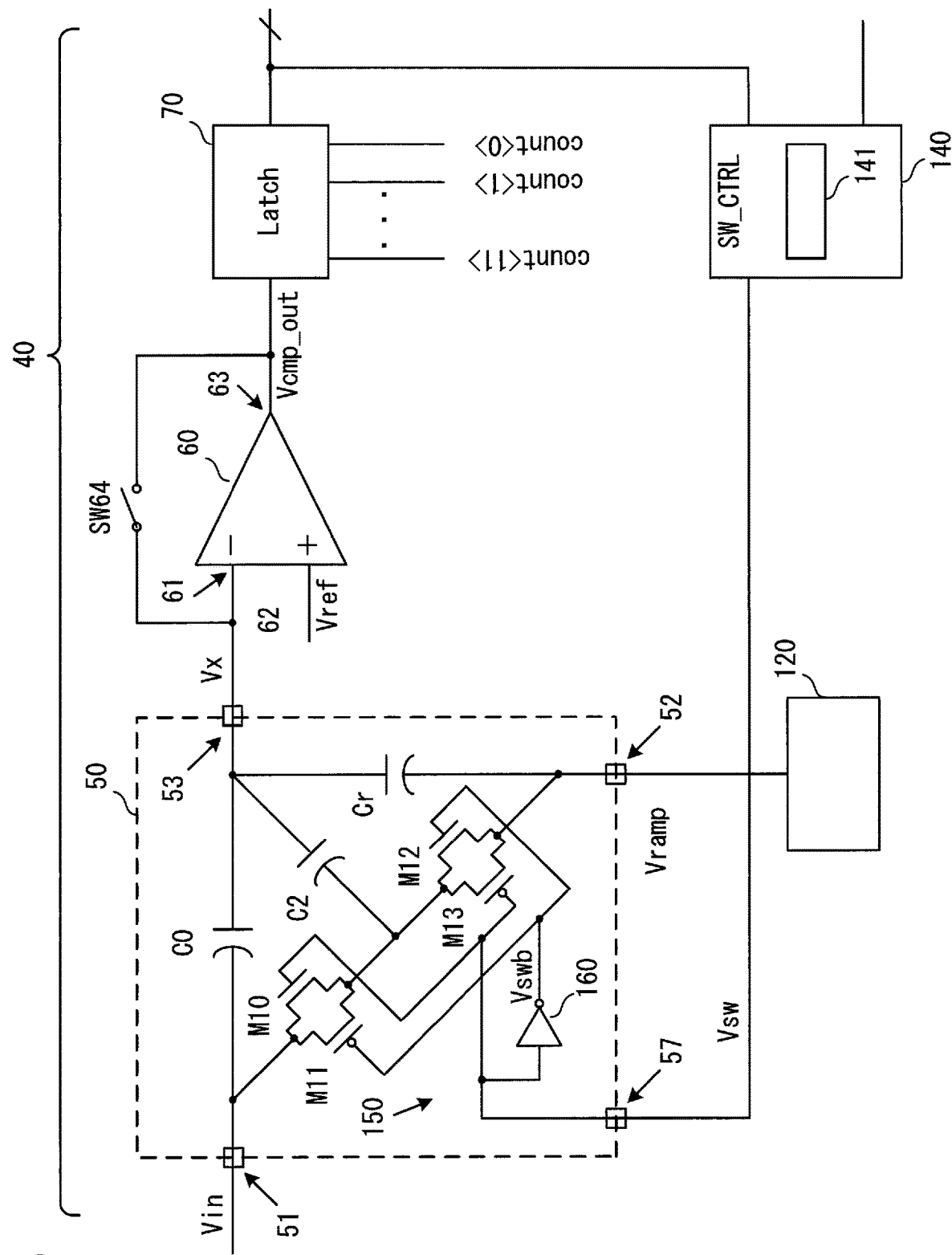

FIG. 5 is a circuit diagram illustrating how the ADC conversion gain may be adjusted at the image sensor 3 in the first embodiment. The image sensor 3 includes a switch control unit 140. The switch control unit 140 generates a signal Vsw to be used to control the connection state of the capacitance C2, based upon the count value output from the storage unit 70, and outputs the signal Vsw to the capacitance unit 50. If the count value is smaller than, for instance, a threshold value, the switch control unit 140 sets the potential of the signal Vsw to high level so as to increase the ADC conversion gain Gc. In addition, if the count value is greater than the threshold value, the switch control unit 140 sets the potential of the signal Vsw to low level so as to decrease the ADC conversion gain Gc. The threshold value for the count value, which changes within a range of, for instance, 0 through 4095 LSB, is set to 682 LSB.

In addition, the switch control unit 140 includes a connection information storage unit 141 constituted with a latch circuit or the like. The switch control unit 140 stores connection information generated based upon the signal level of the signal Vsw, into the connection information storage unit 141. The connection information, which indicates the connection state of the capacitance C2, is used as a digital signal pertaining to the value setting for the ADC conversion gain Gc.

In the example presented in FIG. 5, the capacitance unit 50 includes a third input unit 57, an inverter circuit 160, a transistor M10, a transistor M11, a transistor M12 and a transistor M13. The transistor M10 and the transistor M11 constitute the switch SW21, whereas the transistor M12 and the transistor M13 constitute the switch SW22. The switch SW21 and the switch SW22 are CMOS switches. The signal Vsw is input via the third input unit 57 to the inverter circuit 160, which then outputs a signal Vswb generated by inverting the signal Vsw. The signal Vsw is input individually to the gates of the transistor M10 and the transistor M13, whereas the signal Vswb is input individually to the gates of transistor M11 and the transistor M12.

As the potential of the signal Vsw is set to high level by the switch control unit 140, the signal Vswb shifts to low level, the transistor M10 and the transistor M11 enter an ON state and the transistor M12 and the transistor M13 enter an OFF state. As the transistor M10 and the transistor M11 are turned on, the capacitance C2 is connected in parallel to the capacitance C0 and the ADC conversion gain Gc increases. If, on the other hand, the potential of the signal Vsw is set to low level by the switch control unit 140, the signal Vswb shifts to high level, the transistor M10 and the transistor M11 enter an OFF state and the transistor M12 and the transistor M13 enter an ON state. As the transistor M12 and the transistor M13 are turned on, the capacitance C2 is connected in parallel to the capacitance Cr and the ADC conversion gain Gc decreases.

As described above, the switch control unit 140 controls the connection state of the capacitance C2 with the signal Vsw based upon the account value so as to adjust the ADC conversion gain Gc. In addition, when A/D conversion results are output to a signal processing unit 170 (not shown) disposed at a subsequent stage, the connection information stored in the connection information storage unit 141 is also output to the signal processing unit 170 together with the A/D conversion results. Based upon the connection information, the signal processing unit 170 is able to obtain the value setting for the ADC conversion gain Gc. In the signal processing unit 170, signal processing such as correlated double sampling to be described later, correction processing through which the signal amount is corrected in correspondence to the value setting for the ADC conversion gain Gc and the like, is executed by using the A/D conversion results and the connection information. For instance, if there is a dark area in the photographic field and thus the count value is smaller than the threshold value, the ADC conversion gain Gc is increased so as to prevent clipped blacks from occurring in the image. If, on the other hand, there is a bright area in the photographic field and thus the count value is greater than the threshold value, the ADC conversion gain Gc is decreased so as to prevent clipped whites from occurring in the image. Furthermore, since the capacitance unit 50 and the switch control unit 140 are disposed in correspondence to each pixel, an optimal ADC conversion gain Gc can be set for each pixel.

Figure 6:
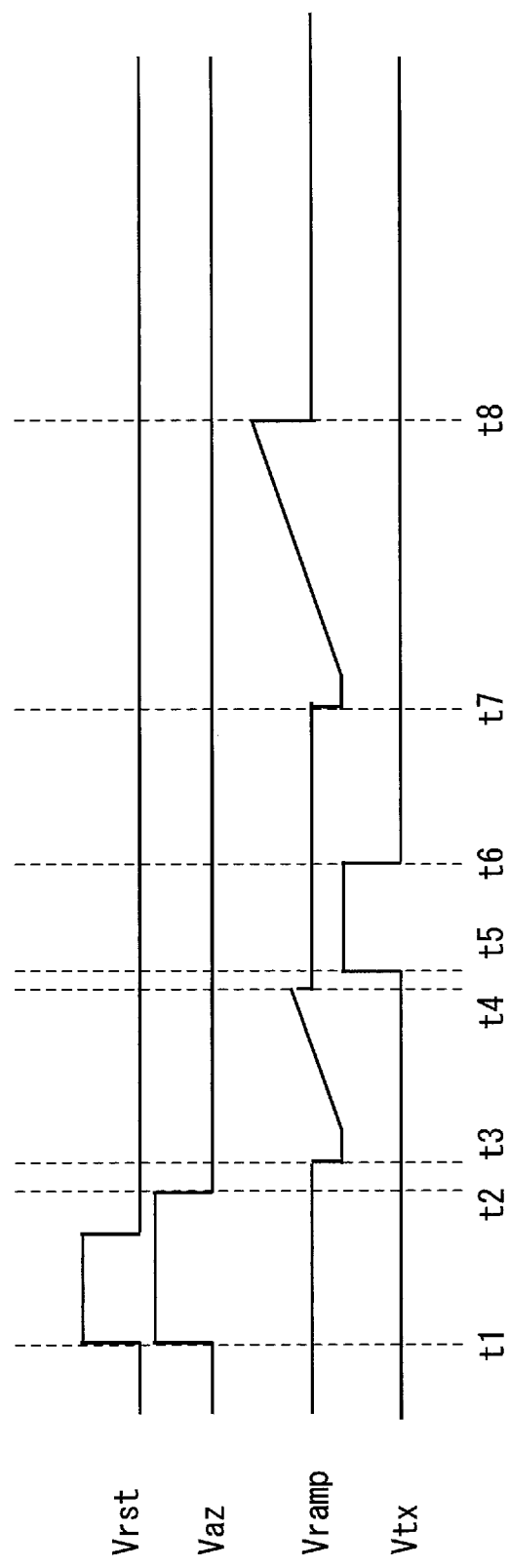

FIG. 6 presents a timing chart pertaining to the correlated double sampling executed in the A/D conversion unit in the first embodiment. It is to be noted that while the electric charge having been accumulated in the photoelectric conversion unit 12 is reset synchronously as the electric charge is discharged from the floating diffusion 15, i.e., synchronously as the floating diffusion 15 is reset, the following explanation is simplified and does not include a description pertaining to the reset of the photoelectric conversion unit 12.

At a time point t1, the signal Vrst and the signal Vaz shift to high level. With the signal Vrst set to high level, the transistor M2 in the reset unit 14 is turned on in the pixel 10. In response, the potential at the floating diffusion 15 is switched to the reset potential. In addition, a signal (dark signal) generated as the pixel 10 is reset is output via the amplifier unit 16 to the signal line 30. The dark signal is input as a signal Vin to the capacitance unit 50 in the A/D conversion unit 40. In addition, the signal Vaz also shifts to high level at the time point t1, and thus, the switch SW64, which is controlled with the signal Vaz is turned on. As the switch SW64 is turned on, the potentials of the signal Vx and the signal Vcmp_out are both set to a level matching the potential of the signal Vref. At a time point t2, the signal Vaz shifts to low level, thereby turning off the switch SW64.

During the period elapsing between a time point t3 and a time point t4, the potential of the signal Vramp increases as the time passes. The comparator unit 60 compares the potential of the output signal Vx with the potential of the second reference signal Vref. The count value is stored into the storage unit 70 as the signal level of the signal Vcmp_out is inverted. A digital signal generated based upon the dark signal provided from the pixel 10 is stored into the storage unit 70.

At a time point t5, the signal Vtx shifts to high-level, thereby turning on the transistor M1 in the transfer unit 13 at the pixel 10. As a result, the electric charge resulting from the photoelectric conversion executed in the photoelectric conversion unit 12 is transferred to the floating diffusion 15. In addition, the photoelectric conversion signal generated in the pixel 10 is output via the amplifier unit 16 to the signal line 30. The photoelectric conversion signal is input as the signal Vin to the capacitance unit 50 of the A/D conversion unit 40. At a time point t6, the signal Vtx shifts to low level, thereby turning off the transistor M1.

During a time period elapsing between a time point t7 and a time point t8, the potential of the signal Vramp increases as the time passes. The comparator unit 60 compares the potential of the output signal Vx with the potential of the second reference signal Vref, and inverts the signal level of the signal Vcmp_out at a point in time at which the relationship between their potential levels change. The count value is stored into the storage unit 70 as the signal level of the signal Vcmp_out is inverted. A digital signal generated based upon the photoelectric conversion signal provided from the pixel 10 is stored into the storage unit 70.

The digital signal generated based upon the dark signal and the digital signal generated based upon the photoelectric conversion signal, both stored in the storage unit 70, are output to the signal processing unit 170, where they undergo differential processing. As described above, the correlated double sampling through which the photoelectric conversion signal and the dark signal undergo differential processing is executed in the embodiment.

Figure 7:
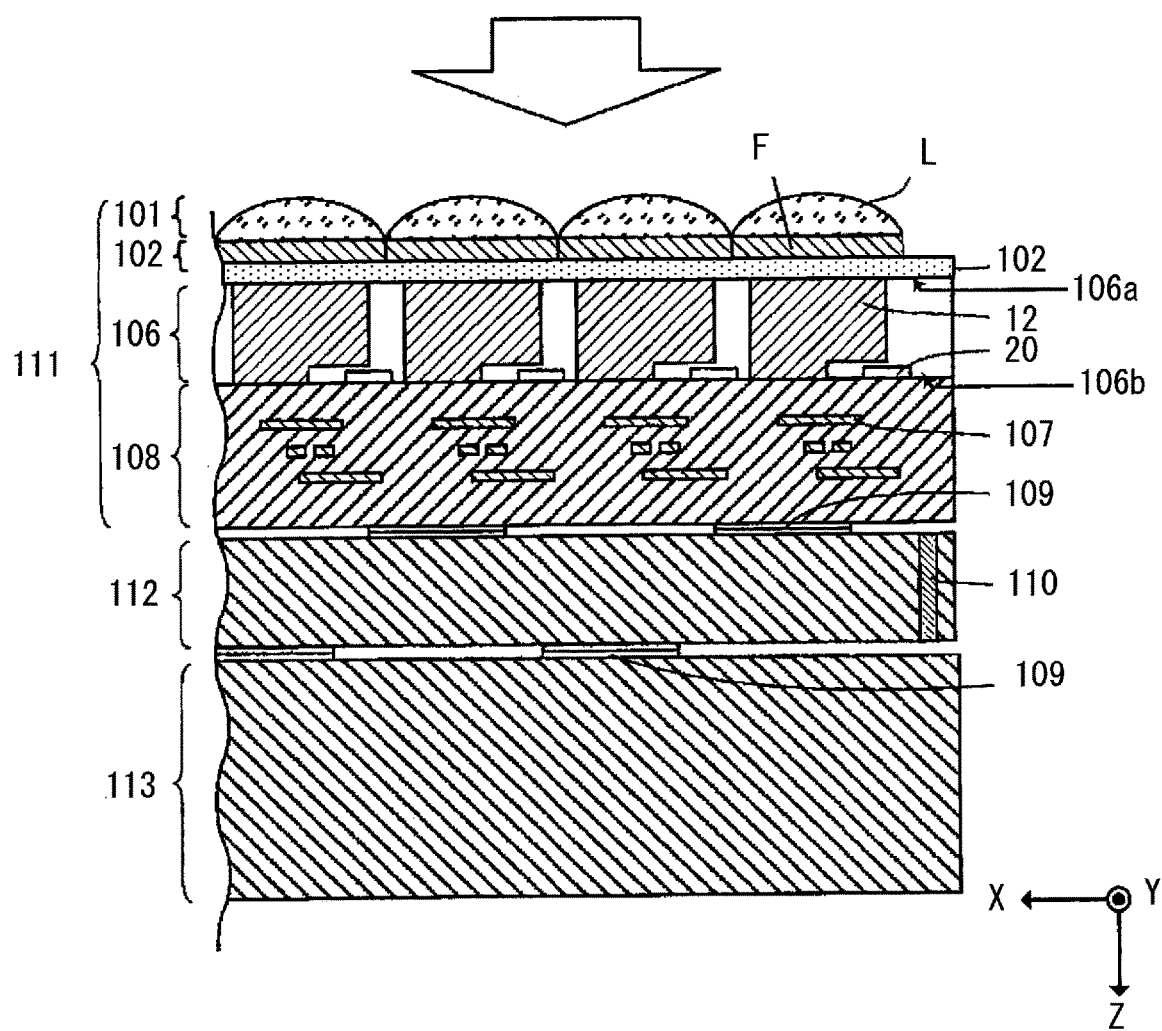

FIG. 7 shows the structure adopted in image sensor 3 in the first embodiment in a sectional view. The image sensor 3 shown in FIG. 7 is a backside illuminated image sensor. The image sensor 3 includes a first semiconductor substrate 111, a second semiconductor substrate 112 and a third semiconductor substrate 113. The first semiconductor substrate 111 is laminated on the second semiconductor substrate 112. The second semiconductor substrate 112 is laminated on the third semiconductor substrate 113. Connector portions 109 electrically connect the first semiconductor substrate 111 with the second semiconductor substrate 112 and the second semiconductor substrate 112 with the third semiconductor substrate 113. The connector portions 109 may be, for instance, bumps or electrodes. As the unfilled arrow in FIG. 7 indicates, incident light enters the image sensor 3 primarily toward the + side along a Z axis. In addition, coordinate axes are set so that the left side of the drawing sheet along an X axis running perpendicular to the Z axis is the X axis+side and that the side closer the viewer looking at the drawing along a Y axis running perpendicular to the Z axis and the X axis is the Y axis+side.

The first semiconductor substrate 111 includes a microlens layer 101, a color filter layer 102, a passivation layer 103, a semiconductor layer 106 and a wiring layer 108. The microlens layer 101 includes a plurality of microlenses L. A microlens L condenses light having entered therein into the corresponding photoelectric conversion unit 12. The color filter layer 102 includes a plurality of color filters F. The passivation layer 103, constituted with a nitride film or an oxide film, protects the semiconductor layer 106.

The semiconductor layer 102 includes photoelectric conversion units 12 and readout units 20. The semiconductor layer 106 includes a plurality of photoelectric conversion units 12, disposed between a first surface 106*a* thereof, which is the light-entry surface, and a second surface 106*b* thereof located on the opposite side from the first surface 106*a*. In the semiconductor layer 106, the readout units 20 are disposed further toward the second surface 106*b* relative to the photoelectric conversion units 12. A plurality of photoelectric conversion units 12 and a plurality of readout units 20 are disposed along the X axis and along the Y axis in the semiconductor layer 106. The readout units 20 each read out a photoelectric conversion signal and a dark signal and output the signals having been read out to the second semiconductor substrate 112 via the wiring layer 108. The wiring layer 108 includes a plurality of metal layers. The metal layers may be, for instance, Al wirings, Cu wirings or the like.

The second semiconductor substrate 112 is formed so as to include capacitance units 50 and comparator units 60. A capacitance unit 50 and a comparator unit 60 are disposed in correspondence to each photoelectric conversion unit 12. The second semiconductor substrate 112 includes a plurality of through-via electrodes 110. The through-via electrodes 110 may be, for instance, through-silicon vias. Circuits disposed at the second semiconductor substrate 112 are connected with one another via the through-via electrodes 110. Storage units 70 are included in the third semiconductor substrate 113. The storage units 70 are each disposed in correspondence to one of the photoelectric conversion units 12.

The following advantages and operations are achieved through the embodiment described above.

(1) The image sensor 3 includes a pixel 10 that generates a pixel signal (photoelectric conversion signal) based upon incident light having entered therein and a generation unit (capacitance unit) 50 that includes a first input unit 51 to which the pixel signal is input, a second input unit 52 to which a first reference signal Vramp with a shifting voltage is input and an output unit 53 that outputs an output signal Vx generated based upon the pixel signal and the first reference signal Vramp. The generation unit 50 further includes a first capacitance (capacitor) C0 disposed between the first input unit 51 and the output unit 53, a second capacitance (capacitor) Cr disposed between the second input unit 52 and the output unit 53, and a third capacitance (capacitor) C2 connected to either the first capacitance C0 or the second capacitance Cr. As a result, the capacitance C2 is prevented from entering a floating state. The occurrence of noise can thus be minimized. In addition, since the ADC conversion gain can be adjusted by switching the capacitance to which the capacitance C2 is connected, ADC conversion gain adjustment can be achieved while requiring only a small circuit area.

(2) The image sensor 3 includes a photoelectric conversion unit 12 that converts incident light to an electric charge, a first input unit 51 to which a signal provided from the photoelectric conversion unit 12 is input, a second input unit 52 to which a first reference signal Vramp is input, an output unit 53 that outputs an output signal Vx generated based upon the signal provided by the photoelectric conversion unit 12 and the first reference signal Vramp, a first capacitance (capacitor) C0 connected between the first input unit 51 and the output unit 53, a second capacitance (capacitor) Cr connected between the second input unit 52 and the output unit 53 and a third capacitance (capacitor) C2 connected in parallel to either the first capacitance C0 or the second capacitance Cr. The capacitance C2 in the embodiment is connected in parallel to either one of the capacitances C0 and the capacitance Cr. Thus, the capacitance C2 is prevented from entering a floating state. This, in turn, makes it possible to minimize the occurrence of noise. In addition, since the ADC conversion gain can be adjusted by switching the capacitance to which the capacitance C2 is connected, ADC conversion gain adjustment can be achieved while requiring only a small circuit area.

(3) The image sensor 3 further includes a first switch unit 150 that connects the third capacitance C2 with either one of the first capacitance C0 and the second capacitance Cr. This structure makes it possible to adjust the shift quantity by which the output signal Vx shifts relative to the shift quantity by which the signal Vx provided from the photoelectric conversion unit 12 shifts and also adjust the shift quantity of the output signal Vx relative to the shift quantity by which the first reference signal Vramp shifts.

(4) The image sensor 3 further includes a first storage unit (connection information storage unit 141) in which information indicating which one of the two capacitances, i.e., the first capacitance C0 and the second capacitance Cr, is connected to the third capacitance C2, is stored. This structure makes it possible to store information pertaining to the value setting for the ADC conversion gain Gc.

(5) The image sensor 3 further includes a comparator unit 60 that compares the output signal Vx output from the output unit 53 with a second reference signal Vref. As a result, comparison results obtained by comparing the output signal Vx with the second reference signal Vref can be output.

(6) The connection information storage unit 141 outputs information when a signal generated based upon the comparison results provided via the comparator unit 60 is output. When A/D conversion results are output to the signal processing unit 170, the connection information, too, is output to the signal processing unit 170 together with the A/D conversion results in the embodiment. These measures enable the signal processing unit 170 to obtain the value setting for the ADC conversion gain based upon the connection information. As a result, the signal processing unit 170 is able to execute signal processing by using the A/D conversion results and the connection information.

(7) The image sensor 3 further includes a first reference signal generation unit 120 that generates the first reference signal Vramp with a shifting signal level. This structural feature makes it possible to cause the potential of the output signal Vx to change over time by inputting the first reference signal Vramp with the shifting signal level to the second input unit 52. In addition, a signal Vcmp_out corresponding to the length of time having elapsed after the comparison start can be generated.

(8) The image sensor 3 includes a plurality of pixels 10 each having a photoelectric conversion unit 12. The first capacitance C0, the second capacitance Cr, the third capacitance C2 and the comparator unit 60 are disposed in correspondence to each pixel. As a result, the ADC conversion gain can be adjusted in correspondence to each pixel.

(9) The third connector C2 is connected in parallel to either of the first input unit 51 and the second input unit 52 based upon the comparison results provided by the comparator unit 60. Thus, the ADC conversion gain can be adjusted based upon the results of the comparison executed by the comparator unit 60.

(10) The image sensor 3 includes a first semiconductor substrate 112 at which a second storage unit (storage unit 70) where a signal generated based upon the results of comparison executed by a comparator unit 60 is stored, a first capacitance (capacitor) C0, a second capacitance (capacitor) Cr, a third capacitance (capacitor) C2 and the comparator unit 60 are disposed, and a second semiconductor substrate 113 at which a storage unit 70 is disposed. This means that a circuit through which an analog signal is processed, such as the comparator unit 60, and a circuit through which a digital signal is processed, such as the storage unit 70, can be disposed at different semiconductor substrates.

Second Embodiment

Figure 8:
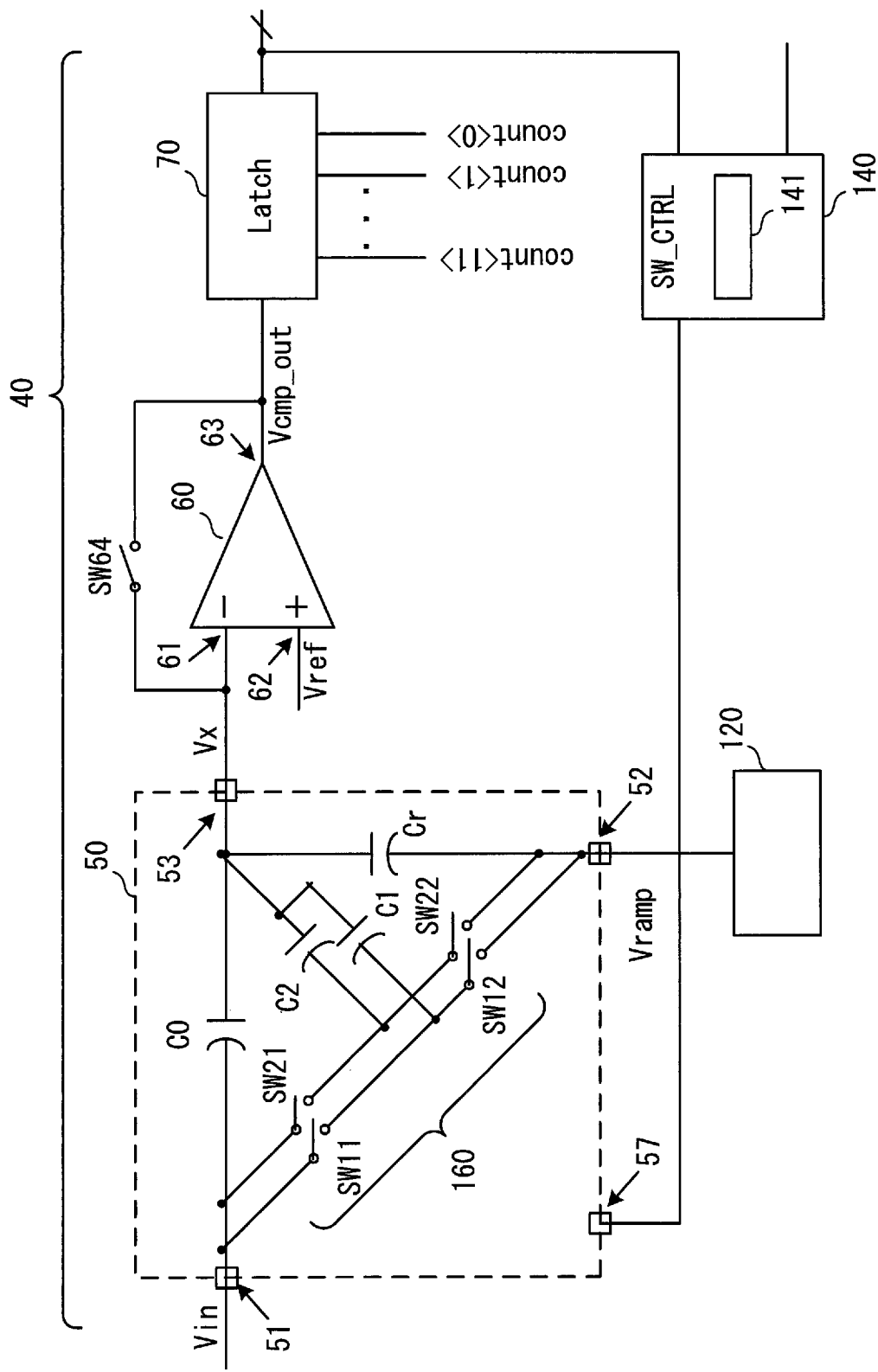

In reference to FIG. 8, an image sensor 3 achieved in the second embodiment will be described. It is to be noted that in the figure, the same reference signs are assigned to components identical to or equivalent to those in the first embodiment and that the following description will focus on the features differentiating the image sensor 3 in the embodiment from the image sensor 3 achieved in the first embodiment. FIG. 8 is a circuit diagram illustrating the structures adopted in an A/D conversion unit 40 and a first reference signal generation unit 120 in the second embodiment. A capacitance unit 50 in the second embodiment further includes a capacitance (capacitor) C1, which is connected in parallel to either one of the capacitance C0 and the capacitance (capacitor) Cr, and a second switch unit 160 that connects the capacitance C1 to either one of the capacitance C0 and the capacitance Cr. The second switch unit 160 includes a switch SW11 and a switch SW12. While the state of the electrical connection between the capacitance C0 and the capacitance C1 is switched via the switch SW11, the state of the electrical connection between the capacitance Cr and the capacitance C1 is switched via the switch SW12.

The switch control unit 140 in the embodiment generates a signal to be used to control the connection states of the capacitance C2 and the capacitance C1 based upon the count value output from the storage unit 70 and outputs the signal thus generated to the capacitance unit 50. The signal generated by the switch control unit 140 and output to the capacitance unit 50 is used to switch the connection states of the capacitance C2 and the capacitance C1. In addition, the switch control unit 140 stores connection information indicating the connection states of the capacitance C2 and the capacitance C1 into a connection information storage unit 141. The connection information, which indicates the connection states of the capacitance C2 and the capacitance C1, is used as a digital signal pertaining to the value setting for the ADC conversion gain Gc. Furthermore, when A/D conversion results are output from the storage unit 70 to a signal processing unit 170 disposed at a subsequent stage, the connection information stored in the connection information storage unit 141, too, is output, together with the A/D conversion results, to the signal processing unit 170.

FIG. 9 presents a chart indicating the switching states of the various switches in the A/D conversion unit 40 in the second embodiment and the corresponding gains. As FIG. 9 indicates, the ADC conversion gain Gc can be adjusted in correspondence to the connection states of the capacitance C2 and the capacitance C1. In addition, the capacitance C2 and the capacitance C1, each connected in parallel to either one of the capacitance C0 and the capacitance Cr, can be prevented from entering a floating state.

In addition to advantages and operations similar to those achieved through the first embodiment, the following advantage and operation are realized in the embodiment described above.

(11) The image sensor 3 further includes a fourth capacitance (capacitor) C1 that is connected in parallel to either the first capacitance C0 or the second capacitance Cr. As a result, the number of value settings for the ADC gain Gc can be increased. In addition, the adjustment range for the ADC gain Gc can be expanded.

Third Embodiment

Figure 10:
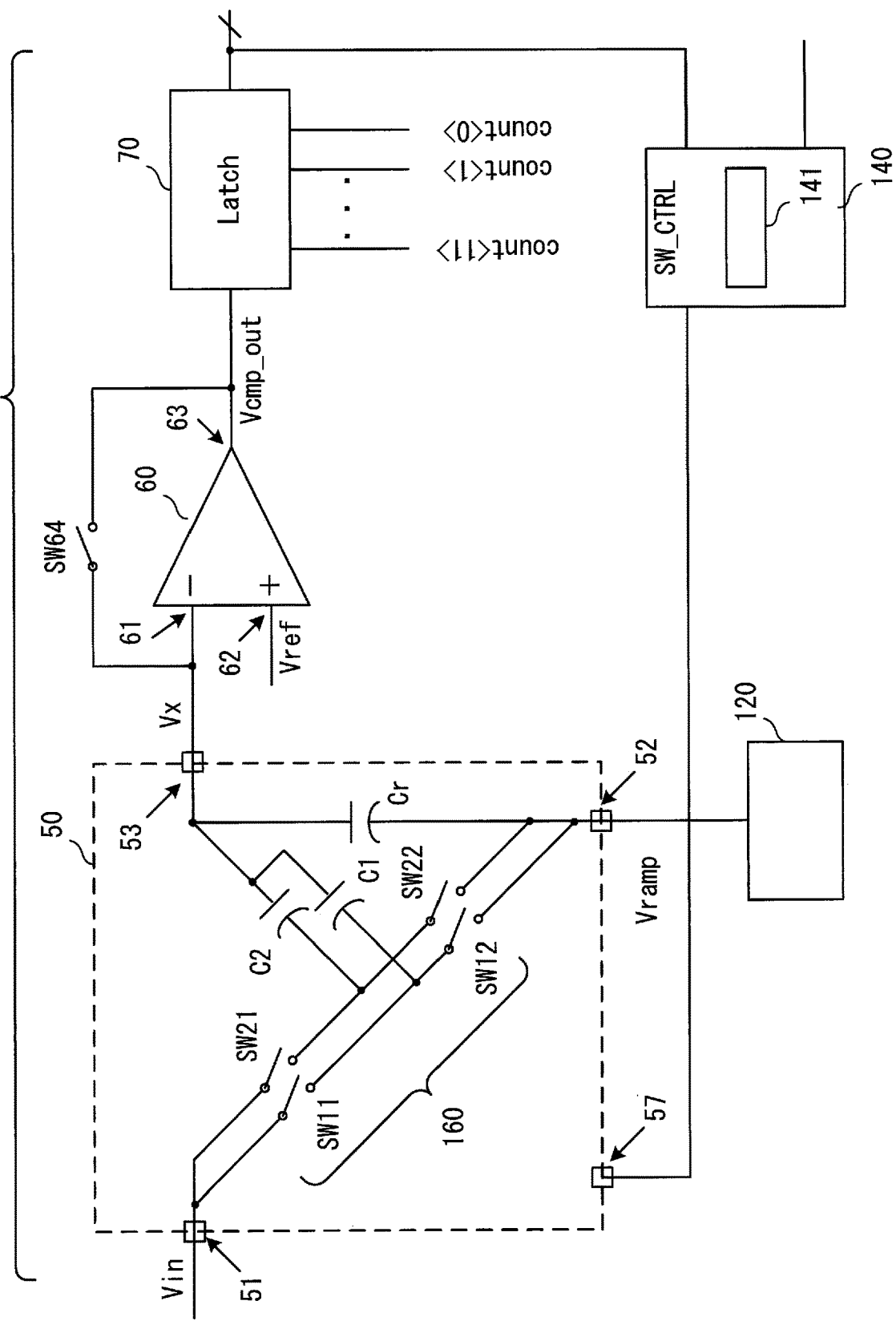

In reference to FIG. 10, an image sensor 3 achieved in a third embodiment will be described. It is to be noted that in the figure, the same reference signs are assigned to components identical to or equivalent to those in the first and second embodiments. FIG. 10 is a circuit diagram illustrating the structures adopted in an A/D conversion unit 40 and a first reference signal generation unit 120 in the third embodiment. The third embodiment is distinguishable from the second embodiment in that the image sensor 3 does not include the capacitance C0.

As in the second embodiment, the switch control unit 140 generates a signal to be used to control the connection states of the capacitance C2 and the capacitance C1 based upon the count value output from the storage unit 70 and outputs the signal thus generated to the capacitance unit 50. The signal generated by the switch control unit 140 and output to the capacitance unit 50 is used to switch the connection states of the capacitance C2 and the capacitance C1. In addition, the switch control unit 140 stores connection information indicating the connection states of the capacitance C2 and the capacitance C1 into a connection information storage unit 141. The connection information, which indicates the connection states of the capacitance C2 and the capacitance C1, is used as a digital signal pertaining to the value setting for the ADC conversion gain Gc. Furthermore, when A/D conversion results are output from the storage unit 70 to a signal processing unit 170 disposed at a subsequent stage, the connection information stored in the connection information storage unit 141, too, is output, together with the A/D conversion results, to the signal processing unit 170. The A/D conversion results and the connection information are output in correlation to each other. Thus, the signal processing unit 170 is able to execute signal processing by using the A/D conversion results and the value setting for the ADC conversion gain Gc indicated in the connection information.

FIG. 11 presents a chart indicating the switching states of the various switches in the A/D conversion unit 40 in the third embodiment and the corresponding gains. As FIG. 11 indicates, the ADC conversion gain Gc can be adjusted in correspondence to the connection states of the capacitance C2 and the capacitance C1. In addition, by executing ON/OFF control for the switches SW21, SW22, SW11 and SW12 as indicated in FIG. 11, the capacitance C2 and the capacitance C1 can be prevented from entering a floating state. In the third embodiment, a configuration that does not include the capacitance C0 can be adopted, since either the capacitance C2 or the capacitance C1 is connected to the first input unit 51 of the capacitance unit 50, as indicated in FIG. 11. As an alternative, a similar configuration that does not include the capacitance Cr may be adopted.

In addition to advantages and operations similar to those achieved through the first embodiment, the following advantage and operation are realized in the embodiment described above.

(12) The image sensor 3 further includes a first switch unit 150 that connects the third capacitance C2 with either one of the first input unit 51 and the second input unit 52 and a second switch unit 160 that connects the first capacitance C1 with either one of the first input unit 51 and the second input unit 52. As a result, the number of value settings for the ADC gain Gc can be increased. In addition, the adjustment range for the ADC gain Gc can be expanded.

The following variations are also within the scope of the present invention and one of the variations or a plurality of variations may be adopted in combination with one of the embodiments described above.

(Variation 1)

Figure 12:
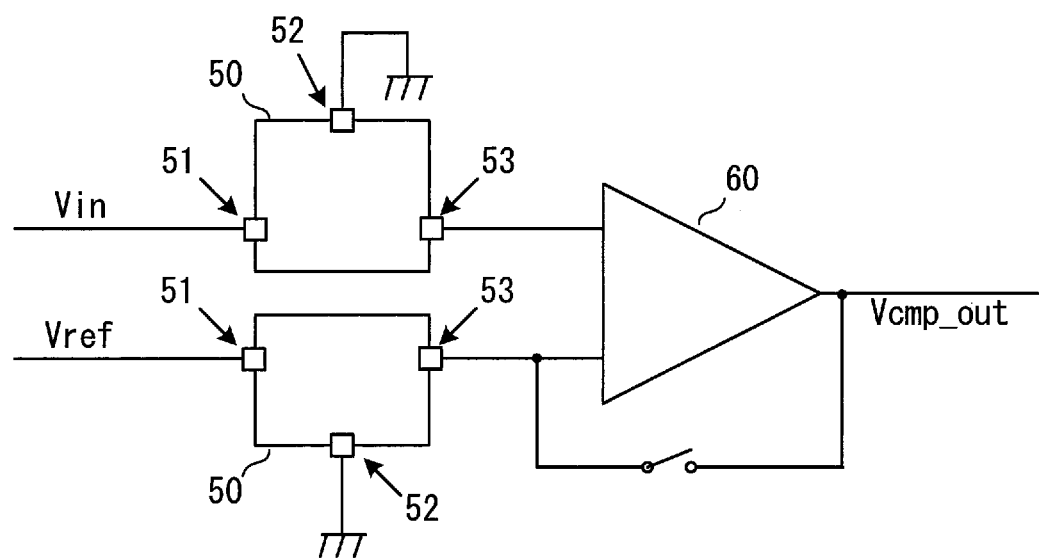

In the embodiments described above, the first reference signal Vramp is input to the second input unit 52 and the second reference signal Vref is input to the second input terminal 62. However, the second reference signal Vref may be input to the second input unit 52 and the first reference signal Vramp may be input to the second input terminal 62, instead. In addition, when inputting the first reference signal Vramp to the second input terminal 62, a ground potential may be input to the second input unit 52. Furthermore, the A/D conversion unit 40 may be configured by using a plurality of capacitance units 50, as illustrated in FIG. 12.

(Variation 2)

In the embodiments described above, an A/D conversion unit 40 is disposed in correspondence to each pixel. However, an A/D conversion unit 40 may be disposed in correspondence to a plurality of pixels. For instance, pixels may be disposed in the RGGB 4-color Bayer array, and in such a case, an A/D conversion unit 40 may be disposed in correspondence to each pixel block made up with the four pixels disposed in the RGGB pattern, or an A/D conversion unit 40 may be disposed in correspondence to each pixel block made up with pixels disposed in even-numbered quantities equal to each other along the row direction and the column direction.

(Variation 3)

Figure 13:
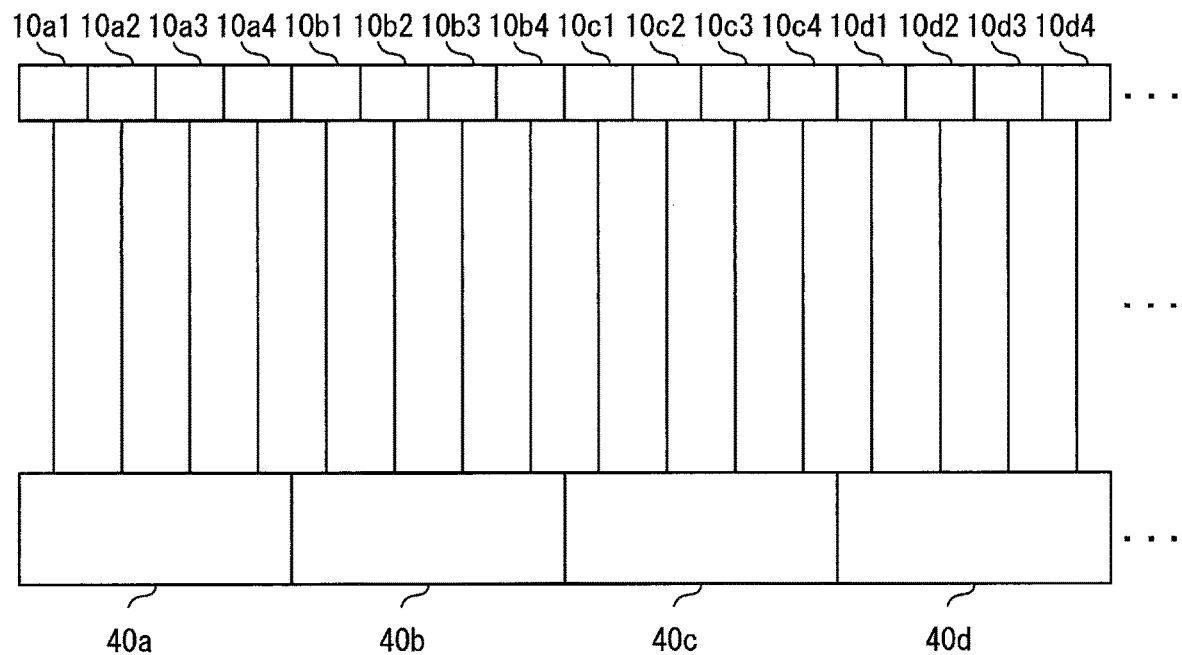
FIG. 13 Circuit diagrams each illustrating the structure adopted in relation to the pixels and the A/D conversion units in variation 3
Figure 13:
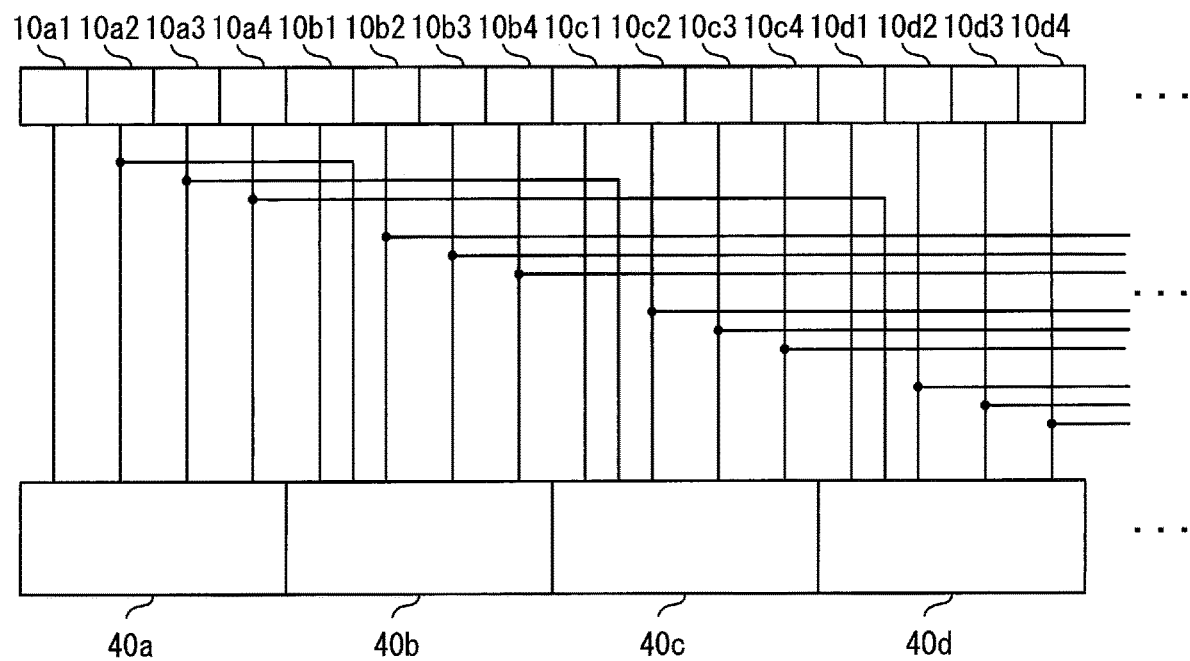

FIG. 13 presents circuit diagrams each illustrating a structure that may be adopted in relation to pixels 10 and A/D conversion units 40 in Variation 3. In the example presented in FIG. 13(a), an A/D conversion unit 40 is disposed in correspondence to a group of four pixels 10 disposed consecutively along the row direction. Namely, a pixel 10a1 through a pixel 10a4 are connected to an A/D conversion unit 40a, a pixel 10b1 through a pixel 10b4 are connected to an A/D conversion unit 40b, a pixel 10c1 through a pixel 10c4 are connected to an A/D conversion unit 40c and a pixel 10d1 through a pixel 10d4 are connected to an A/D conversion unit 40d.

The example presented in FIG. 13(b) is distinguishable from the example presented in FIG. 13(a) in that the A/D conversion unit 40b is also connected to the pixel 10a2, the A/D conversion unit 40c is also connected to the pixel 10a3, and the A/D conversion unit 40d is also connected to the pixel 10a4. This structural feature makes it possible to input a signal provided from the pixel 10a1 in the first row to the A/D conversion unit 40a, input a signal provided from the pixel 10a2 in the second row to the A/D conversion unit 40b, input a signal provided from the pixel 10a3 in the third row to the A/D conversion unit 40c and input signal provided from the pixel 10a4 in the fourth row to the A/D conversion unit 40d when, for instance, reading out signals from the pixels 10 by selecting pixels 10 in each row through the rolling shutter method. The A/D conversion unit 40a through the A/D conversion unit 40d individually execute analog/digital conversion processing by using the signals input thereto. In addition, by engaging the A/D conversion unit 40a through the A/D conversion unit 40d in parallel operation, pixel selection/scanning can be executed at high speed. Consequently, the rolling shutter operation, too, can be executed at high speed.

(Variation 4)

The A/D conversion units 40 in the embodiments described above are each configured with an integrated A/D conversion circuit that executes A/D conversion by shifting the signal level of a reference signal as time passes. However, the A/D conversion units 40 may adopt another circuit structure, such as a successive approximation A/D conversion circuit structure.

(Variation 5)

The switch control unit 140 in the embodiments described above generate a signal Vsw based upon the count value output from the storage unit 70 and outputs the signal Vsw thus generated to the capacitance unit 50. As an alternative, the switch control unit 140 may read out the connection information stored in the connection information storage unit 141, generate a signal based upon the connection information and output the signal to the capacitance unit 50. Connection information from the signal processing unit 170 may be written into the connection information storage unit 141, or connection information originating from an external source outside the image sensor may be written into the connection information storage unit 141. In addition, the connection information from the signal processing unit 170 or from an external source outside the image sensor written into the connection information storage unit 141 may carry different contents, each in correspondence to one of the pixels or each in correspondence to a specific pixel group made up with a plurality of pixels, or it may carry common content applicable to all the pixels.

(Variation 6)

While the capacitance unit, having been described in reference to the embodiments and the variations above, is part of the A/D conversion unit 40 in the image sensor 3, the present invention is not limited to this example. The capacitance unit (capacitance device) may be used as a capacitance unit in a circuit other than an electronic circuit included in the image sensor 3. Furthermore, the capacitance unit may be used in an electronic circuit other than an A/D conversion circuit.

While various embodiments and variations thereof are explained above, the present invention is in no way limited to the particulars of these examples. Any other modes conceivable within the scope of the technical teaching of the present invention is also within the scope of the present invention.

The disclosure of the following priority application is herein incorporated by reference:

Japanese Patent Application No. 2016-38156 filed Feb. 29, 2016.

REFERENCE SIGNS LIST

3 image sensor, 12 photoelectric conversion unit, 40 A/D conversion unit, 50 capacitance unit, 60 comparator unit, 70 storage unit,

The invention claimed is:

1. An image sensor, comprising:
first photoelectric conversion unit that converts light to an electric charge;
a second photoelectric conversion unit that converts light into an electric charge, the second photoelectric conversion unit being arranged in line with the first photoelectric conversion unit in a row direction;
a third photoelectric conversion unit that converts light into an electric charge, the third photoelectric conversion unit being arranged in line with the first photoelectric conversion unit in a column direction;
a first conversion unit that converts an analog signal into a digital signal;
a second conversion unit that converts an analog signal into a digital signal; and
a third conversion unit that converts an analog signal into a digital signal, wherein:
the first conversion unit comprises:
a first signal input unit into which is input a first signal that is based on the electric charge converted by the first photoelectric conversion unit;
a first ramp signal input unit into which a ramp signal whose signal value changes over time is input;
a first signal output unit that outputs a first output signal that is generated by (i) the first signal input to the first signal input unit and (ii) the ramp signal input to the first ramp signal input unit;
a first capacitance unit comprising:
a first capacitance disposed between the first signal input unit and the first signal output unit;
a second capacitance disposed between the first ramp signal input unit and the first signal output unit;
a third capacitance electrically connected to at least one of the first capacitance and the second capacitance;
a first input terminal electrically connected to the first signal output unit and into which the first output signal is input;
a second input terminal into which a reference signal is input; and
a first comparison unit that compares a value of the first output signal input to the first input terminal with a value of the reference signal input to the second input terminal;
a first storage unit that stores a first digital signal converted from the first output signal into a digital signal by a comparison result of the first comparison unit;
the second conversion unit comprises:
a second signal input unit into which is input a second signal that is based on the electric charge converted by the second photoelectric conversion unit;
a second ramp signal input unit into which the ramp signal is input;
a second signal output unit that outputs a second output signal that is generated by (i) the second signal input to the second signal input unit and (ii) the ramp signal input to the second ramp signal input unit;
a second capacitance unit comprising:
a fourth capacitance disposed between the second signal input unit and the second signal output unit;
a fifth capacitance disposed between the second ramp signal input unit and the second signal output unit;
a sixth capacitance electrically connected to at least one of the fourth capacitance and the fifth capacitance;
a third input terminal electrically connected to the second signal output unit and into which the second output signal is input;
a fourth input terminal into which the reference signal is input; and
a second comparison unit that compares a value of the second output signal input to the third input terminal with a value of the reference signal input to the fourth input terminal; and
a second storage unit that stores a second digital signal converted from the second output signal into a digital signal by a comparison result of the second comparison unit;
the third conversion unit comprises:
a third signal input unit into which is input a third signal that is based on the electric charge converted by the third photoelectric conversion unit;
a third ramp signal input unit into which the ramp signal is input;
a third signal output unit that outputs a third output signal that is generated by (i) the first signal input to the first signal input unit and (ii) the ramp signal input to the third ramp signal input unit;
a third capacitance unit comprising:
a seventh capacitance disposed between the third signal input unit and the third signal output unit;
an eighth capacitance disposed between the third ramp signal input unit and the third signal output unit;
a ninth capacitance electrically connected to at least one of the seventh capacitance and the eighth capacitance;
a fifth input terminal electrically connected to the third signal output unit and into which the third output signal is input;
a sixth input terminal into which the reference signal is input;
a third comparison unit that compares a value of the third output signal input to the fifth input terminal with a value of the reference signal input to the sixth input terminal; and
a third storage unit that stores a third digital signal converted from the third output signal into a digital signal by a comparison result of the third comparison unit;

the image sensor further comprises:
- a first control unit that, based on a value of the first digital signal stored in the first storage unit, controls such that one of the first capacitance and the second capacitance is electrically connected to the third capacitance;
- a second control unit that, based on a value of the second digital signal stored in the second storage unit, controls such that one of the fourth capacitance and the fifth capacitance is electrically connected to the sixth capacitance; and
- a third control unit that, based on a value of the third digital signal stored in the third storage unit, controls such that one of the seventh capacitance and the eighth capacitance is electrically connected to the ninth capacitance;

the first photoelectric conversion unit, the second photoelectric conversion unit, and the third photoelectric conversion unit are arranged on a first semiconductor substrate; and the first capacitance unit, the second capacitance unit, the third capacitance unit, the first comparison unit, the second comparison unit, and the third comparison unit are arranged on a second semiconductor substrate laminated with the first semiconductor substrate, wherein:

the first control unit (i) controls (a) the first capacitance, among the first capacitance and the second capacitance, and (b) the third capacitance to be connected in parallel when the value of the first digital signal is smaller than a predetermined threshold and (ii) controls (a) the second capacitance, among the first capacitance and the second capacitance, and (b) the third capacitance to be connected in parallel when the value of the first digital signal is larger than a predetermined threshold;

the second control unit (i) controls (a) the fourth capacitance, among the fourth capacitance and the fifth capacitance, and (b) the sixth capacitance to be connected in parallel when the value of the second digital signal is smaller than a predetermined threshold and (ii) controls (a) the fifth capacitance, among the fourth capacitance and the fifth capacitance, and (b) the sixth capacitance to be connected in parallel when the value of the second digital signal is larger than a predetermined threshold; and the third control unit (i) controls (a) the seventh capacitance, among the seventh capacitance and the eighth capacitance, and (b) the ninth capacitance to be connected in parallel when the value of the third digital signal is smaller than a predetermined threshold and (ii) controls (a) the eighth capacitance, among the seventh capacitance and the eighth capacitance, and (b) the ninth capacitance to be connected in parallel when the value of the third digital signal is larger than a predetermined threshold.

2. The image sensor according to claim 1, wherein:
the first capacitance includes
- an electrode that is electrically connected to the first signal input unit; and
- an electrode that is electrically connected to the first signal output unit;

the second capacitance includes
- an electrode that is electrically connected to the first ramp signal input unit; and
- an electrode that is electrically connected to the first signal output unit;

the fourth capacitance includes
- an electrode that is electrically connected to the second signal input unit; and
- an electrode that is electrically connected to the second signal output unit;

the fifth capacitance includes
- an electrode that is electrically connected to the second ramp signal input unit; and
- an electrode that is electrically connected to the second signal output unit;

the seventh capacitance includes
- an electrode that is electrically connected to the third signal input unit; and
- an electrode that is electrically connected to the third signal output unit; and the eighth capacitance includes
- an electrode that is electrically connected to the third ramp signal input unit; and
- an electrode that is electrically connected to the third signal output unit.

3. The image sensor according to claim 1, wherein:
the first conversion unit includes a first switch unit for electrically connecting the third capacitance to at least one of the first signal input unit and the first ramp signal input unit;

the second conversion unit includes a second switch unit for electrically connecting the sixth capacitance to at least one of the second signal input unit and the second ramp signal input unit;

the third conversion unit includes a third switch unit for electrically connecting the ninth capacitance to at least one of the third signal input unit and the third ramp signal input unit;

the first control unit controls the first switch unit based on the value of the first digital signal stored in the first storage unit such that one of the first capacitance and the second capacitance is connected in parallel to the third capacitance;

the second control unit controls the second switch unit based on the value of the second digital signal stored in the second storage unit such that one of the fourth capacitance and the fifth capacitance is connected in parallel to the sixth capacitance; and the third control unit controls the third switch unit based on the value of the third digital signal stored in the third storage unit such that one of the seventh capacitance and the eighth capacitance is connected in parallel to the ninth capacitance.

4. The image sensor according to claim 1, wherein:
the second photoelectric conversion unit is arranged adjacent to the first photoelectric conversion unit in the row direction.

5. The image sensor according to claim 4, wherein
the first storage unit, the second storage unit, and the third storage unit are arranged on a third semiconductor substrate laminated with the first semiconductor substrate.

6. The image sensor according to claim 4, wherein
the third photoelectric conversion unit is arranged adjacent to the first photoelectric conversion unit in the column direction.

7. The image sensor according to claim 6, wherein
the first storage unit, the second storage unit, and the third storage unit are arranged on a third semiconductor substrate laminated with the first semiconductor substrate.

8. The image sensor according to claim 1, wherein:

the third photoelectric conversion unit is arranged adjacent to the first photoelectric conversion unit in the column direction.

9. The image sensor according to claim 8, wherein the first storage unit, the second storage unit, and the third storage unit are arranged on a third semiconductor substrate laminated with the first semiconductor substrate.

10. The image sensor according to claim 1, wherein the first control unit includes a first connection information storage unit that stores first connection information showing to which of the first capacitance and the second capacitance the third capacitance is connected in parallel;

the second control unit includes a second connection information storage unit that stores second connection information showing to which of the fourth capacitance and the fifth capacitance the sixth capacitance is connected in parallel; and the third control unit includes a third connection information storage unit that stores third connection information showing to which of the seventh capacitance and the eighth capacitance the ninth capacitance is connected in parallel.

11. The image sensor according to claim 10, further comprising:

a first signal processing unit that performs a first signal processing on the first digital signal stored in the first storage unit;

a second signal processing unit that performs a second signal processing on the second digital signal stored in the second storage unit; and a third signal processing unit that performs a third signal processing on the third digital signal stored in the third storage unit.

12. The image sensor according to claim 11, wherein:

the first control unit outputs the first connection information stored in the first connection information storage unit to the signal processing unit;

the second control unit outputs the second connection information stored in the second connection information storage unit to the signal processing unit;

the third control unit outputs the third connection information stored in the third connection information storage unit to the signal processing unit;

the first signal processing unit performs the first signal processing on the first digital signal using the first connection information;

the second signal processing unit performs the second signal processing on the second digital signal using the second connection information; and the third signal processing unit performs the third signal processing on the third digital signal using the third connection information.

13. An image capturing device, comprising:
the image sensor according to claim 1; and
a generator that is electrically connected to the image sensor and generates image data.

14. An image capturing device, comprising:
the image sensor according to claim 2; and
a generator that is electrically connected to the image sensor and generates image data.

15. An image capturing device, comprising:
the image sensor according to claim 3; and
a generator that is electrically connected to the image sensor and generates image data.

16. An image capturing device, comprising:
the image sensor according to claim 4; and
a generator that is electrically connected to the image sensor and generates image data.

17. An image capturing device, comprising:
the image sensor according to claim 8; and
a generator that is electrically connected to the image sensor and generates image data.

* * * * *